(12) United States Patent
Melchior et al.

(10) Patent No.: US 6,554,493 B2
(45) Date of Patent: Apr. 29, 2003

(54) CONFIGURATION FOR COUPLING OPTOELECTRONIC ELEMENTS AND FIBER ARRAYS

(75) Inventors: Lutz Melchior, Berlin (DE); Volker Plickert, Brieselang (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/045,714

(22) Filed: Jan. 14, 2002

(65) Prior Publication Data
US 2002/0081078 A1 Jun. 27, 2002

Related U.S. Application Data

(63) Continuation of application No. PCT/DE00/02306, filed on Jul. 12, 2000.

(30) Foreign Application Priority Data
Jul. 12, 1999 (DE) .......................................... 199 32 907

(51) Int. Cl.[7] .................................................. G02B 6/36
(52) U.S. Cl. .............................. 385/89; 385/14; 385/52
(58) Field of Search ............................. 385/88–94, 14, 385/51, 52, 78, 80, 83, 137

(56) References Cited

U.S. PATENT DOCUMENTS

| 5,230,030 | A | 7/1993 | Hartman et al. | ............... 395/50 |
|---|---|---|---|---|
| 5,742,720 | A | 4/1998 | Kobayashi et al. | ........... 385/89 |
| 6,234,687 | B1 * | 5/2001 | Hall et al. | ..................... 385/88 |
| 6,227,722 | B1 * | 8/2001 | Kropp | .......................... 385/88 |

FOREIGN PATENT DOCUMENTS

| DE | 197 05 042 C1 | 7/1998 |
|---|---|---|
| DE | 197 09 842 C1 | 10/1998 |
| EP | 0 596 613 A2 | 5/1994 |
| JP | 04-283708 | 10/1992 |
| WO | WO 00/02070 | 1/2000 |

* cited by examiner

Primary Examiner—Phan T. H. Palmer
(74) Attorney, Agent, or Firm—Laurence A. Greenberg; Werner H. Stemer; Gregory L. Maybach

(57) ABSTRACT

A coupling configuration is described which contains optoelectronic elements having optically active zones, a coupling element, and optical waveguide sections for coupling to each of the optoelectronic elements. The optical waveguide sections is disposed in the coupling element, the optical waveguide sections are disposed in at least two planes including a first plane and a second plane. The optical waveguide sections of different ones of the two planes are offset in relation to one another. Optical coupling paths run between the optical waveguide sections and the optically active zones. At least some of the optical coupling paths allocated to the optical waveguide sections of the first plane pass through intermediate spaces that exist between the optical waveguide sections of the second plane.

11 Claims, 4 Drawing Sheets

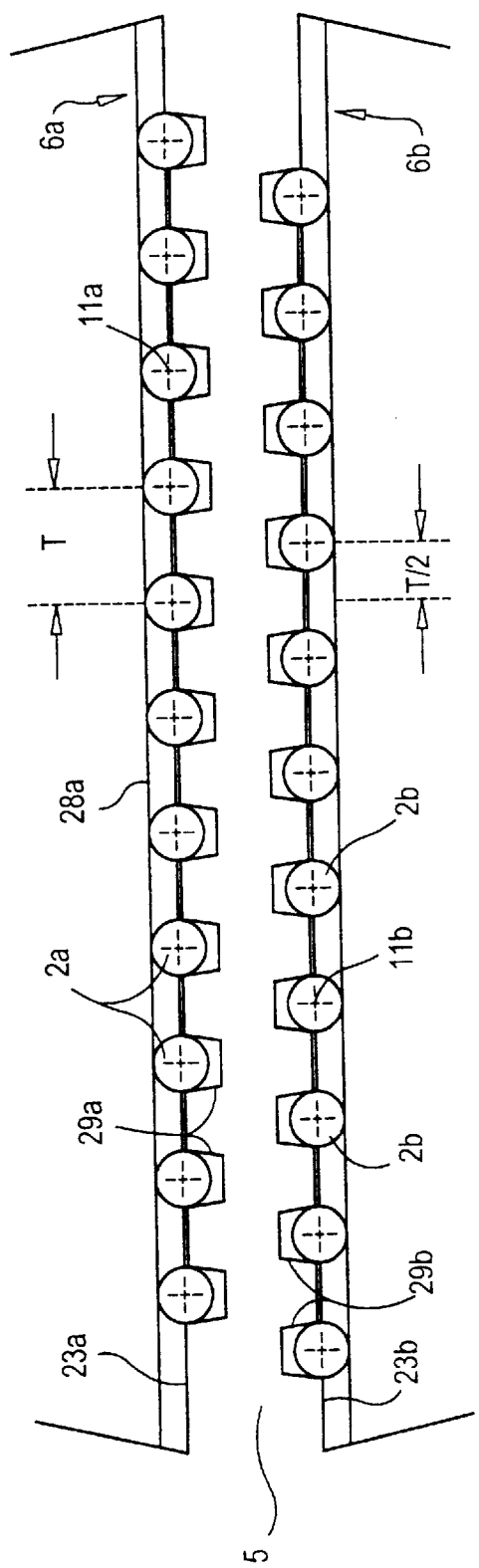

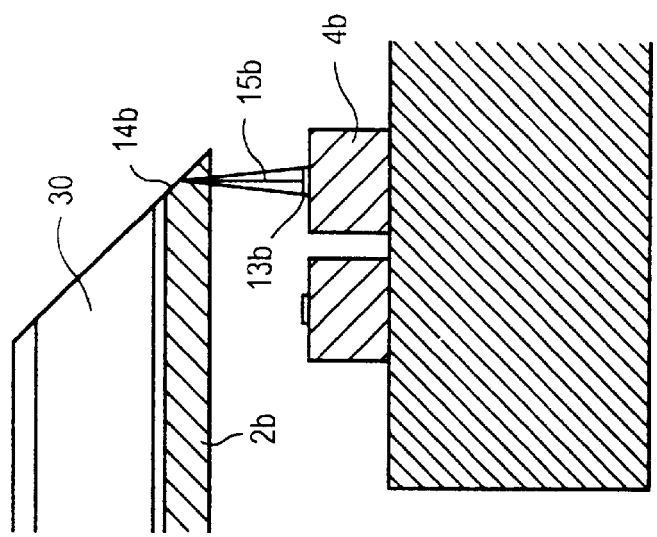
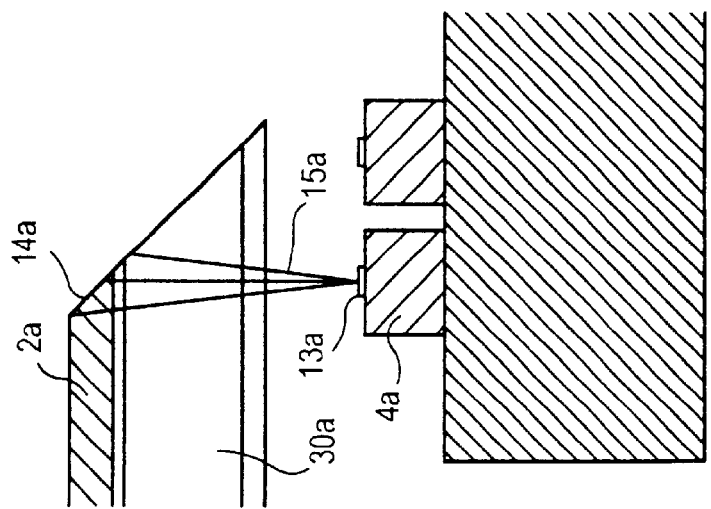

CONFIGURATION FOR COUPLING OPTOELECTRONIC ELEMENTS AND FIBER ARRAYS

CROSS-REFERENCE TO RELATED APPLICATION

This application is a continuation of copending International Application No. PCT/DE00/02306, filed Jul. 12, 2000, which designated the United States.

BACKGROUND OF THE INVENTION

FIELD OF THE INVENTION

The invention concerns the field of optical data transmission technology, and relates to a configuration for coupling optoelectronic elements, each having an optically active zone, to individually allocated optical waveguide sections. The optical waveguide sections are contained in a coupling element and optical coupling paths run between the optical waveguide sections and the optically active zones.

In the context of the invention, an optoelectronic element should be taken to be a transmitter or a receiver. When driven electrically, an optoelectronic element configured as a transmitter converts the electrical signals into optical signals, which are emitted in the form of light signals. When optical signals are applied to it, an optoelectronic element configured as a receiver converts them into corresponding electrical signals that can be taken from the output. The region of an optoelectronic element where the aforementioned signal conversions take place will also be referred to below as the optically active zone.

Further, an optical waveguide is understood as being any device for the guided delivery of an optical signal over a substantial distance in space, in particular preassembled optical waveguides and other "wave guides".

The region within which the optical signals travel between the optically active zone and the input or output position of an optical waveguide section, which is individually allocated just to the zone, while freely propagating through air and/or another medium that is optically transparent in the wavelength range used and/or through imaging optical elements, will be referred to below as the optical coupling path.

German Patent DE 197 05 042 C1 discloses a coupling configuration of the type described in the introduction, in which e.g. twelve parallel optical waveguide sections (fibers) are disposed between two high-accuracy bores for alignment pins and are coupled to optoelectronic elements that are individually allocated to them. A support contains structured recesses, into which the optical waveguide sections are fitted, and reflecting surfaces for deflecting light.

PCT Patent Application PCT/DE99/01959 describes a multiple optical jack (ferrule). The ferrule has a jacket casing with two holding regions for holding optical waveguide sections. The holding regions are disposed above one another as viewed in the insertion direction. In order to connect two jacket casings, guide bores for guide pins may be provided extending in the insertion direction.

U.S. Pat. No. 5,230,030 discloses a system for coupling a plurality of optical waveguide sections, which are guided in a plurality of planes, to semiconductor chips. U.S. Pat. No. 5,230,030 does not provide any further details about the respective allocation of the optical waveguide to the semiconductor chips.

SUMMARY OF THE INVENTION

It is accordingly an object of the invention to provide a configuration for coupling optoelectronic elements and fiber arrays which overcomes the above-mentioned disadvantages of the prior art devices of this general type, in which a large number of optical waveguide sections are coupled in a narrow space to individually allocated optoelectronic elements.

With the foregoing and other objects in view there is provided, in accordance with the invention, a coupling configuration. The coupling configuration contains optoelectronic elements having optically active zones, a coupling element, and optical waveguide sections for coupling to each of the optoelectronic elements. The optical waveguide sections are disposed in the coupling element, and the optical waveguide sections are disposed in at least two planes including a first plane and a second plane. The optical waveguide sections of different ones of the two planes are offset in relation to one another. Optical coupling paths run between the optical waveguide sections and the optically active zones. At least some of the optical coupling paths allocated to the optical waveguide sections of the first plane pass through intermediate spaces that exist between the optical waveguide sections of the second plane.

The object is achieved according to the invention, in the case of a configuration of the type mentioned in the introduction, by the fact that the optical waveguide sections are disposed in at least two planes so that at least some of the coupling paths allocated to the optical waveguide sections of one plane pass through intermediate spaces that exist between optical waveguide sections of the other plane.

By disposing the optical waveguide sections in a plurality of planes, it is possible to couple a large number of optical waveguide sections with optoelectronic elements allocated individually to them, without interference, with lower loss and without extending the coupling configuration. It is therefore possible to continue using geometries that have become established on the market (e.g. the distances of the positioning devices). The spacing (separation) of the optical waveguide sections in the individual planes allows the coupling paths, which are allocated to the optical waveguide sections of one plane, to run through intermediate spaces between the optical waveguide sections of the other plane. In this way, it is possible to couple a large number of optical waveguide sections with optoelectronic elements allocated individually to them, with a simple and compact configuration.

One embodiment of the configuration, which is particularly advantageous in terms of manufacturing technology, is distinguished by the fact that the optical waveguide sections lying in a common plane are spaced apart from one another at a constant separation, and the optical waveguide sections of different planes are offset in relation to one another.

With a view to a simple and compact configuration of the coupling paths between the optical waveguide sections and the optoelectronic elements, a further advantageous configuration of the configuration according to the invention proposes that the coupling-side end surfaces of the optical waveguide sections be ground at an angle and polished and, for example, carry a reflective coating.

With a view to particularly accurate and reliable fixing of the optical waveguide sections in the coupling element, in a preferred refinement of the invention, the coupling element contains a precision part and two slide members, which fix the optical waveguide sections in the precision part.

In addition to this, the optical waveguide sections and the slide members may be adhesively bonded in their intended position.

A further embodiment of the configuration according to the invention, which is favorable in terms of construction and saves on material, proposes that a part of the precision part protrude beyond the optoelectronic elements in the manner of a collar support.

Particularly low-loss coupling is possible, according to a further embodiment of the invention, if the coupling element has material recesses in the vicinity of the optical coupling paths.

In terms of manufacturing technology, it is particularly preferable and cost-effective to use a coupling element that is formed of a plastic and is made by precision injection molding.

A further advantageous embodiment is characterized in that the optoelectronic elements are fitted on at least one support, and the optically active zones of the optoelectronic elements are disposed in at least two rows.

With a view to simple attachment of the electrical drive system to the optoelectronic elements, the support may have electrical contacts and interconnections with the optoelectronic elements. In addition to this, the coupling element and the support may be mounted on a common casing circuit board.

Other features which are considered as characteristic for the invention are set forth in the appended claims.

Although the invention is illustrated and described herein as embodied in a configuration for coupling optoelectronic elements and fiber arrays, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an enlarged rear-elevational view of an excerpt shown in FIG. 2;

FIG. 4 is sectional view taken along the line IV—IV shown in FIG. 1; and

FIG. 5 is sectional view taken along the line V—V shown in FIG. 1.

DESCRIPTION OF THE PREFERRED EMBODIMENTS

Figure 1:
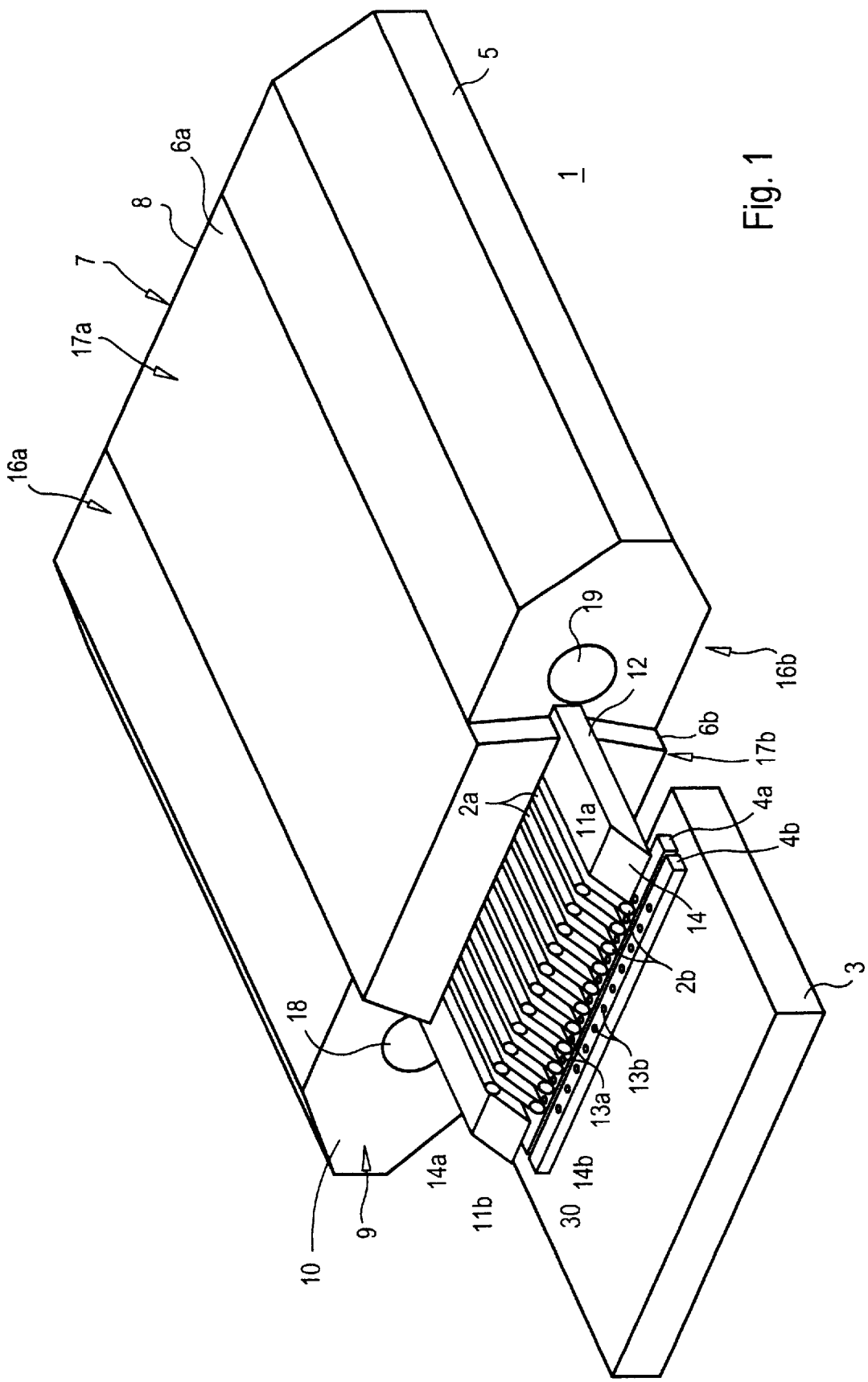
FIG. 1 is a diagrammatic, perspective view of a configuration with optical waveguide sections fixed in a coupling element and optoelectronic elements that are fitted on a support according to the invention.

Referring now to the figures of the drawing in detail and first, particularly, to FIG. 1 thereof, there is shown a configuration containing a coupling element 1, in which optical waveguide sections 2a, 2b are contained, and a support 3 on which optoelectronic elements 4a, 4b are fitted. The optoelectronic elements 4a, 4b are fitted to the support 3 in the form of transmission and/or reception arrays.

The coupling element 1 is formed of a precision part 5 and two slide members 6a, 6b and has a first side 7, which cannot be seen in FIG. 1 (e.g. facing a connection jack which is not shown), with a first end surface 8. A second side 9 with a second end surface 10 lies opposite the first side 7 and faces the optoelectronic elements 4a, 4b. In the precision part 5, the optical waveguide sections 2a, 2b run in two parallel planes 11a, 11b (see FIG. 3). The precision part 5, together with the optical waveguide sections 2a, 2b fixed therein and the inserted slide members 6a, 6b, is ground and polished on the first end surface 8 at a right angle to the planes 11a, 11b of the optical waveguide sections 2a, 2b. On the second side 9 of the precision part 5, a part 12 in which the optical waveguide sections 2a, 2b are contained projects from the second end surface 10 in the manner of a collar support and protrudes beyond optically active zones 13a, 13b of the optoelectronic elements 4a, 4b. The two slide members 6a, 6b may also project over the second end surface 10, in order to give the optical waveguide sections 2a, 2b the requisite support with a view to subsequent processing (e.g. polishing), and hence protect them from damage. The part 12 has a surface 14 that is inclined by 45° in relation to the planes 11a, 11b of the optical waveguide sections 2a, 2b. The surface 14, together with the optical waveguide sections 2a, 2b, is ground and polished. The surface is subsequently metallized. The coupling-side metallized end surfaces of the individual optical waveguide sections 2a, 2b hence act as mirrors 14a, 14b for a 90° beam deflection, so that the light signals travel downward from the mirrors 14a, 14b onto the optically active zones 13a, 13b of the optoelectronic elements (receivers), or from the optically active zones 13a, 13b of the optoelectronic elements (transmitters) to the mirrors 14a, 14b.

Optical coupling paths 15a, 15b (see also FIGS. 4 and 5), along which light signals travel, hence run between the optically active zones 13a, 13b and the mirrors 14a, 14b.

The support 3 and the coupling element 1 may be located on a non-illustrated housing circuit board, and may be the core piece of a transmission or reception module, or of a transmission and reception module (transceiver).

Holding regions 17a, 17b (see also FIG. 2) are formed on an upper side 16a and a lower side 16b of the precision part 5. In the precision part 5, guide bores 18, 19 are respectively provided in a region on the left and on the right of the holding regions, which bores may extend through the entire precision part 5 and emerge on the first and second end surfaces of the precision part 5. Guide pins, not shown in this view, which protrude from the precision part 5 over the first and second end surfaces, and via which coupling with another element may be carried out very accurately, are provided in the guide bores 18, 19. Advantageously, all the high-precision contours are made only in the precision part 5.

Figure 2:
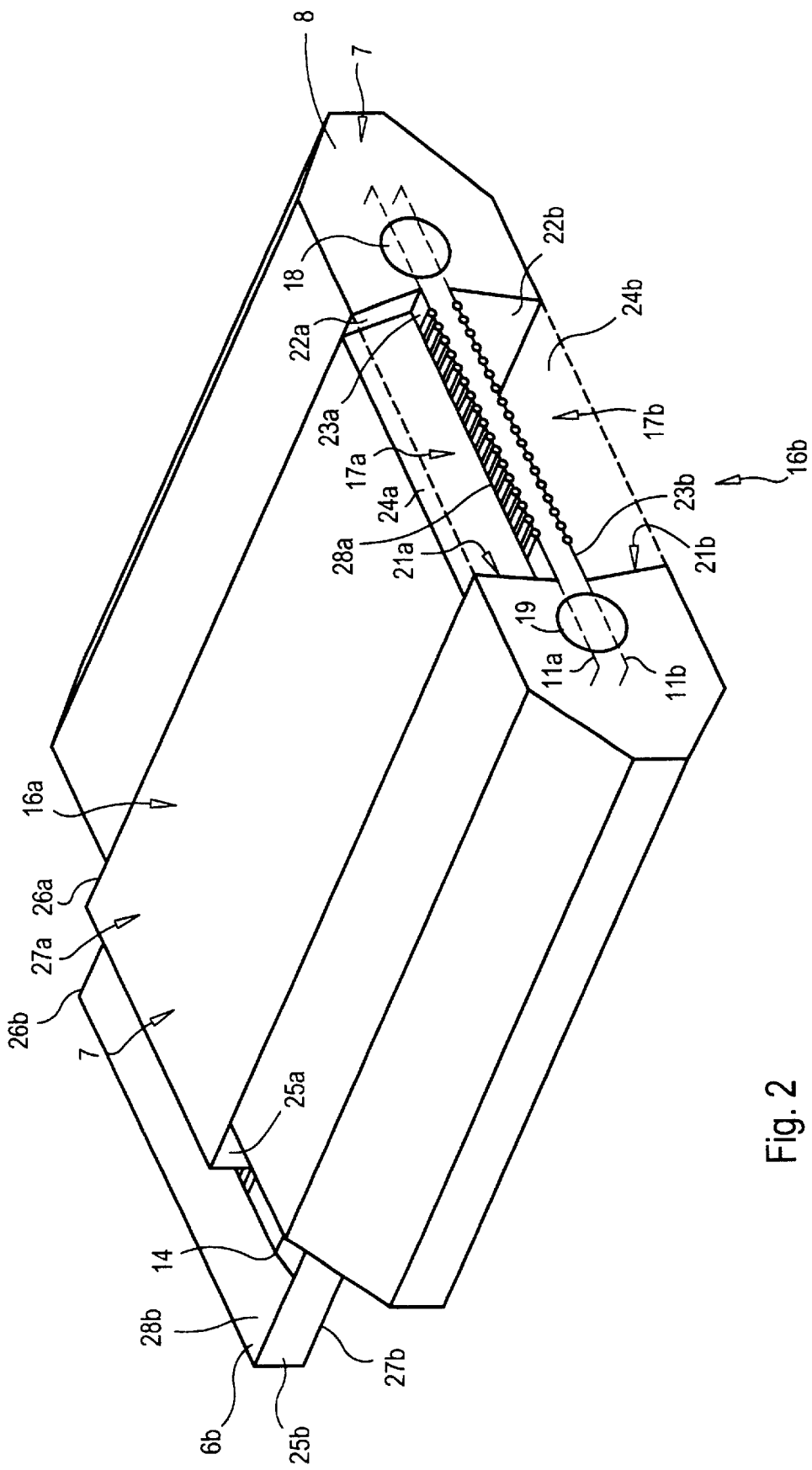
FIG. 2 is a perspective view of the coupling element shown in FIG. 1 from a first side.

FIG. 2 shows a perspective view of the first side 7 of the coupling element.

Each of the holding regions 17a, 17b is bounded by two side surfaces 21a, 22a and 21b, 22b, respectively, and one base surface 23a, 23b and has, respectively on the upper side 16a or lower side 16b, an opening 24a and 24b, respectively. The side surfaces 21a, 21b, 22a, 22b serve to guide the slide members 6a, 6b. The distance between the side surfaces increases continuously, starting at the opening and continuing in the direction of the base surfaces 23a, 23b. The holding regions 17a, 17b therefore have a trapezoidal cross section.

Correspondingly, the slide members 6a, 6b also have a trapezoidal cross section. Side surfaces 25a, 26a and 25b, 26b, respectively, likewise assist the guidance. In the inserted state, surfaces 27a, 27b of the slide members 6A, 6B end flush with the upper side 16a and the lower side 16b, respectively, of the precision part. Wider surfaces 28a, 28b of the slide members 6a, 6b lie at a short distance from the base surfaces 23a, 23b of the holding regions 17a, 17b. The trapezoidal or dovetailed shape of the holding regions prevents the slide members 6a, 6b from falling out in the inserted state.

The centers of the guide bores 18, 19 on the left and right of the holding regions lie on a plane that runs centrally between the planes 11a, 11b of the optical waveguide sections 2a, 2b. For coding purposes, the guide bores 18, 19 may also be disposed offset in order to ensure that only their matching counterparts can be inserted.

FIG. 3 shows an enlarged excerpt of the coupling element 1, in which the optical waveguide sections 2a, 2b are fixed.

The base surfaces 23a, 23b of the holding regions of the precision part 5 contain grooves 29a, 29b, which run from the first end surface 8 to the surface 14 and in which the optical waveguide sections 2a, 2b are placed. The optical waveguide sections 2a, 2b are therefore disposed in the two planes 11a, 11b in the precision part 5 of the coupling element 1, each optical waveguide section 2a being fastened uniquely in its position by threefold bracing on two side surfaces of the grooves 29a and the nearby wider surface 28a of the slide member 6a. In addition to this, the optical waveguide sections and/or the slide members may be fastened in their intended position by a special adhesive.

The optical waveguide sections 2a lying in a common plane 11a are spaced apart from one another at a constant separation T. The optical waveguide sections 2b, 2a of different planes are offset in relation to one another by half the separation T (T/2).

FIGS. 4 and 5 show sectional representations of the configuration according to FIG. 1 along the lines IV—IV and V—V shown in FIG. 1. The line IV—IV runs along the lengthwise axis of an optical waveguide section 2a, which is contained in the upper plane 11a, and the line V—V runs along the lengthwise axis of an optical waveguide section 2b, which is contained in the lower optical waveguide section plane 11b. The precision part 5 has, in particular in the part 12, material recesses 30 in the vicinity of the coupling paths 15a between the optical waveguide sections of the planes 11b.

The purpose of the material recesses 30 is to permit light signals to pass, with the least possible loss, from the optically active zone 13a of an optoelectronic element 4a (transmitter), through the cladding of the optical waveguide sections of the upper element 11a, to the mirror 14a. At the mirror 14a, the light signals are deflected through 90° and subsequently travel via the optical waveguide section 2a in the direction of the first end surface 8. Conversely, light signals which, coming from the first end surface 8, are guided in the optical waveguide section 2a become deflected through 90° at the mirror 14a. The light signals would then emerge from the cladding of the optical waveguide sections 2a of the upper plane 11a, and would propagate freely through the material recesses 30 and hence travel without interference as far as the optically active zone 13a of the allocated optoelectronic element 4a (receiver). The region through which the optical coupling paths 15a, 15b run may also be filled with an optically transparent medium.

The light signals that emerge from the claddings of the optical waveguide sections 2b of the lower plane 11b travel while propagating freely to the optoelectronic elements 4b (receivers) allocated to the zones 13b. In the opposite direction, light signals that emerge from the zones 13b of optoelectronic elements 4b (transmitters), would travel while propagating freely as far as the cladding of the optical waveguide sections 2b. From there, the light signals would enter the optical waveguide sections, be deflected through 90° at the mirror 14b and be guided as far as the first end surface 8.

We claim:

1. A coupling configuration, comprising:

optoelectronic elements having optically active zones;

a coupling element;

optical waveguide sections for coupling to each of said optoelectronic elements, said optical waveguide sections disposed in said coupling element, said optical waveguide sections disposed in at least two planes including a first plane and a second plane, said optical waveguide sections of different ones of said two planes being offset in relation to one another; and optical coupling paths running between said optical waveguide sections and said optically active zones, at least some of said optical coupling paths allocated to said optical waveguide sections of said first plane pass through intermediate spaces that exist between said optical waveguide sections of said second plane.

2. The configuration according to claim 1, wherein said coupling element has a precision part and two slide members, said two slide members fix said optical waveguide sections to said precision part.

3. The configuration according to claim 2, wherein said optical waveguide sections and said slide members are adhesively bonded in their intended position.

4. The configuration according to claim 2, wherein said precision part has a part protruding beyond said optoelectronic elements in a manner of a collar support.

5. The configuration according to claim 1, including at least one support on which said optoelectronic elements are fitted, and said optically active zones of said optoelectronic elements are disposed in at least two rows on said support.

6. The configuration according to claim 5, wherein said support has electrical contacts and interconnections with said optoelectronic elements.

7. The configuration according to claim 1, wherein said coupling element has material recesses formed therein in a vicinity of said optical coupling paths.

8. The configuration according to claim 1, wherein said coupling element is formed of plastic and is made by precision injection molding.

9. The configuration according to claim 1, wherein said optical waveguide sections lying in each of said two planes are spaced apart from one another at a constant separation.

10. The configuration according to claim 1, wherein said optical waveguide sections (2a, 2b) have coupling-side end surfaces which are ground at an angle, polished, and carry a reflective coating.

11. A configuration for coupling optoelectronic elements having optically active zones to optical waveguide sections, the configuration comprising:

a coupling element for housing the optical waveguide sections for coupling to each of the optoelectronic elements, the optical waveguide sections disposed in at least two planes including a first plane and a second plane in said coupling element, the optical waveguide sections of different ones of said two planes being offset in relation to one another in said coupling element; and optical coupling paths running between the optical waveguide sections and the optically active zones, at least some of said optical coupling paths allocated to the optical waveguide sections of said first plane pass through intermediate spaces that exist between the optical waveguide sections of said second plane.

* * * * *